US012074405B2

(12) United States Patent
Ishii et al.

(10) Patent No.: US 12,074,405 B2
(45) Date of Patent: Aug. 27, 2024

(54) TERMINAL BLOCK SET INCLUDING TERMINAL BLOCKS CONNECTED TO EACH OTHER

(71) Applicant: OMRON Corporation, Kyoto (JP)

(72) Inventors: Hirotoshi Ishii, Moriyama (JP); Tadahiko Ogawa, Ritto (JP); Aiki Kora, Osaka (JP); Takashi Sakaguchi, Takatsuki (JP); Yuki Kuniyasu, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 452 days.

(21) Appl. No.: 17/312,716

(22) PCT Filed: Dec. 6, 2019

(86) PCT No.: PCT/JP2019/047838
§ 371 (c)(1),
(2) Date: Jun. 10, 2021

(87) PCT Pub. No.: WO2020/121969
PCT Pub. Date: Jun. 18, 2020

(65) Prior Publication Data

US 2022/0021135 A1 Jan. 20, 2022

(30) Foreign Application Priority Data

Dec. 14, 2018 (JP) ................................ 2018-234669

(51) Int. Cl.
*H01R 9/26* (2006.01)
*H01R 9/24* (2006.01)
*H01R 31/08* (2006.01)

(52) U.S. Cl.
CPC ............ *H01R 9/26* (2013.01); *H01R 9/2408* (2013.01); *H01R 9/2458* (2013.01); *H01R 9/2675* (2013.01); *H01R 31/08* (2013.01)

(58) Field of Classification Search
CPC ...... H01R 9/26; H01R 9/2408; H01R 9/2458; H01R 9/2625; H01R 9/2675; H01R 31/08
See application file for complete search history.

(56) References Cited

U.S. PATENT DOCUMENTS 5,839,922 A * 11/1998 Orlando .............. H01R 9/2408 439/717
2009/0035997 A1 2/2009 Correll
2013/0196558 A1 8/2013 Adachi et al.

FOREIGN PATENT DOCUMENTS

CN 103140987 A 6/2013
DE 102007033942 A1 1/2009
(Continued)

OTHER PUBLICATIONS

International Search Report for International Application No. PCT/JP2019/047838; Date of Mailing, Mar. 3, 2020.
(Continued)

*Primary Examiner* — Michael C Zarroli
(74) *Attorney, Agent, or Firm* — CANTOR COLBURN LLP

(57) ABSTRACT

A terminal block which can be coupled to another terminal block in an electrically connected state includes a housing, an input-side power supply terminal and an output-side power supply terminal. The housing includes a first wall portion and a second wall portion. The input-side power supply terminal and the output-side power supply terminal are arranged along the second wall portion inside the housing. The housing includes a protruding portion that functions as an obstructing member that hinders connection of the input-side power supply line to the input-side power supply
(Continued)

terminal and a through hole that is arranged in a vicinity of the input-side power supply terminal of the second wall portion and penetrates the second wall portion in the first direction to allow insertion of the obstructing member.

5 Claims, 7 Drawing Sheets

(56) References Cited

FOREIGN PATENT DOCUMENTS

| | | | |
|---|---|---|---|
| EP | 0310474 | A1 | 4/1989 |
| FR | 2621424 | A1 | 4/1989 |
| JP | H01115025 | A | 5/1989 |
| JP | 2000231950 | A | 8/2000 |
| JP | 2017027836 | A | 2/2017 |

OTHER PUBLICATIONS

PCT Written Opinion of the International Searching Authority for International Application No. PCT/JP2019/047838; Date of Mailing, Mar. 3, 2020.

CNIPA 1st Office Action for corresponding CN Application No. 201980079061.2; Issued on Sep. 15, 2022.

EPO Extended European Search Report for corresponding EP Application No. 19897112.9; Issued on Jun. 30, 2022.

* cited by examiner

TERMINAL BLOCK SET INCLUDING TERMINAL BLOCKS CONNECTED TO EACH OTHER

CROSS REFERENCE TO RELATED APPLICATIONS

This is the U.S. national stage of application No. PCT/JP2019/047838, filed on Dec. 6, 2019. Priority under 35 U.S.C. § 119(a) and 35 U.S.C. § 365(b) is claimed from Japanese Application No. 2018-234669 filed Dec. 14, 2018, the disclosure of which is also incorporated herein by reference.

TECHNICAL FIELD

The present disclosure relates to a plurality of terminal blocks that can be coupled to one another.

BACKGROUND ART

Patent Literature 1 discloses a terminal block in which a plurality of terminal block units are coupled.

CITATION LIST

Patent Literature

PTL 1 JP 2017-027836 A

SUMMARY OF INVENTION

Technical Problem

In the terminal block, adjacent terminal block units are coupled by inserting a coupling fitting for one terminal block unit into an insertion hole of the other terminal block unit. That is, since there is no configuration for holding the coupling of the plurality of terminal block units other than the coupling between the adjacent terminal block units, when the coupling between the adjacent terminal block units is loosened due to vibration or the like, it may be difficult to ensure the coupling reliability of the plurality of terminal block units.

An object of the present disclosure is to provide a terminal block set capable of ensuring coupling reliability between adjacent terminal blocks.

Solution to Problem

A terminal block set of an example of the present disclosure, in which a plurality of terminal blocks are coupled along a first direction, each of the terminal blocks including a housing that includes a first wall portion provided on a first side in the first direction and a second wall portion provided on a second side in the first direction are coupled along the first direction, includes:

- a first terminal block and a second terminal block adjacent to the first terminal block as the plurality of terminal blocks; and
- a C-shaped coupling member that sandwiches, and couples and holds the first wall portion of the housing of the first terminal block and the second wall portion of the housing of the second terminal block.

Advantageous Effects of Invention

The terminal block set includes the C-shaped coupling member that sandwiches, and couples and holds the first wall portion of the housing of the first terminal block and the second wall portion of the housing of the second terminal block. With such a configuration, since the terminal blocks adjacent to each other can be coupled and held more reliably, it is possible to realize the terminal block set capable of securing coupling reliability between the terminal blocks adjacent to each other.

DESCRIPTION OF EMBODIMENTS

Hereinafter, an example of the present disclosure will be described with reference to the accompanying drawings. In the following description, terms indicating specific directions or positions (for example, terms including "up," "down," "right," and "left") are used as necessary, but the use of these terms is to facilitate understanding of the present disclosure with reference to the drawings, and the technical scope of the present disclosure is not limited by the meanings of these terms. Further, the following description is merely exemplary in nature and is not intended to limit the present disclosure, an object for application, or a usage. Furthermore, the drawings are schematic, and ratios of dimensions and the like do not necessarily match actual ones.

Figure 1:
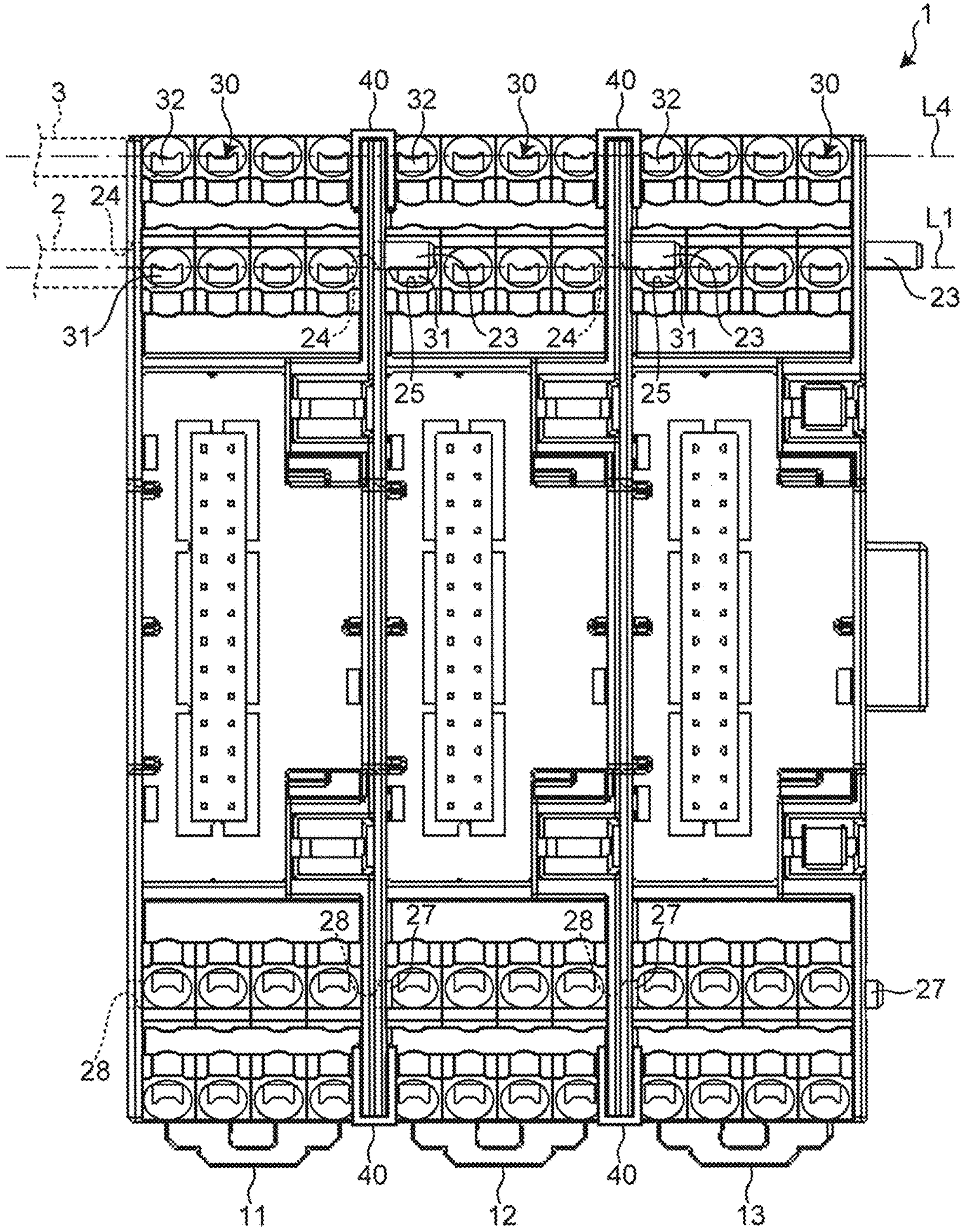
FIG. 1 is a plan view showing a terminal block set according to an embodiment of the present disclosure.

As shown in FIG. 1, a terminal block set 1 of an embodiment of the present disclosure includes a plurality of terminal blocks coupled along a first direction X in an electrically connected state. In the present embodiment, the terminal block set 1 includes, as the plurality of terminal blocks, a first terminal block 11, a second terminal block 12, and a third terminal block 13 which are electrically connected to each other.

Hereinafter, a direction intersecting (for example, orthogonal to) the first direction X is referred to as a second direction Y, and a direction intersecting (for example, orthogonal to) the first direction X and the second direction Y is referred to as a third direction Z.

Figure 2:
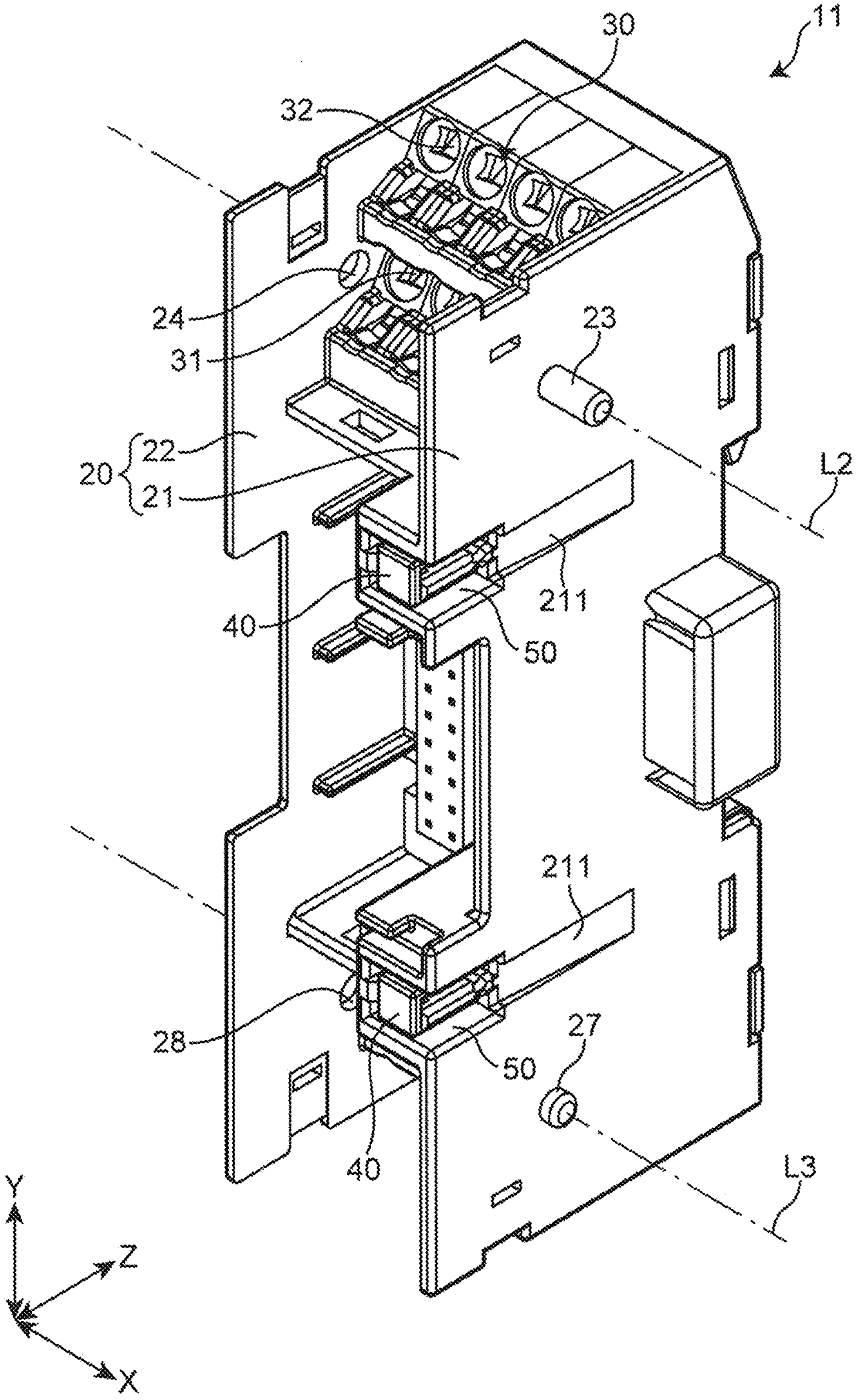
FIG. 2 is a perspective view showing a terminal block of the terminal block set of FIG. 1.

As shown in FIG. 2, each of the terminal blocks 11, 12, and 13 includes an insulating housing 20 and a plurality of terminals 30 arranged inside the housing 20. The terminal blocks 11, 12, and 13 are, for example, push-in connection type terminal blocks having substantially the same shape and size. In FIG. 2, only the first terminal block 11 is shown.

As shown in FIG. 2, the housing 20 has a substantially rectangular parallelepiped shape, and includes a first wall portion 21 provided on one side in the first direction X and extending in the second direction Y, and a second wall portion 22 provided on the other side in the first direction X and extending in the second direction Y. The first wall portion 21 and the second wall portion 22 each have a substantially rectangular shape when viewed from the first direction X, and are arranged substantially parallel to each other at an interval in the first direction X.

The first wall portion 21 includes a protruding portion 23 protruding from the first wall portion 21 in the first direction X and in a direction away from the second wall portion 22. The protruding portion 23 is formed of a substantially columnar protruding member 231, and is arranged in the vicinity of an imaginary straight line L1 (shown in FIG. 1) extending in the first direction X through an input-side power supply terminal 31 described later when viewed from the third direction Z. In the present embodiment, the protruding portion 23 is provided at one end in the longitudinal direction (that is, the upper end of FIG. 2) of the outer surface of the first wall portion 21. The second wall portion 22 includes a first through hole 24 that is arranged in the vicinity of the input-side power supply terminal 31 and penetrates the second wall portion 22 in the first direction X. Each of the protruding portion 23 and the first through hole 24 is arranged on an imaginary straight line L2 (shown in FIG. 2) extending in the first direction X.

As shown in FIGS. 1 and 2, the plurality of terminals 30 are provided at both end portions in the second direction Y (that is, in the longitudinal direction of the housing 20). In the present embodiment, eight terminals 30 are arranged in a lattice pattern extending in the first direction X and the second direction Y in regions at both ends of the housing 20 in the second direction Y.

The terminals 30 include the input-side power supply terminal 31 and output-side power supply terminal 32. Each of the input-side power supply terminal 31 and the output-side power supply terminal 32 is arranged along the second wall portion 22 of the housing 20, and is configured to be connectable to each of an input-side power supply line 2 and an output-side power supply line 3 (both shown in FIG. 1). In the present embodiment, each of the input-side power supply terminal 31 and the output-side power supply terminal 32 is arranged along the second wall portion 22 in the region on the upper side in the second direction Y of the housing 20.

Figure 3:
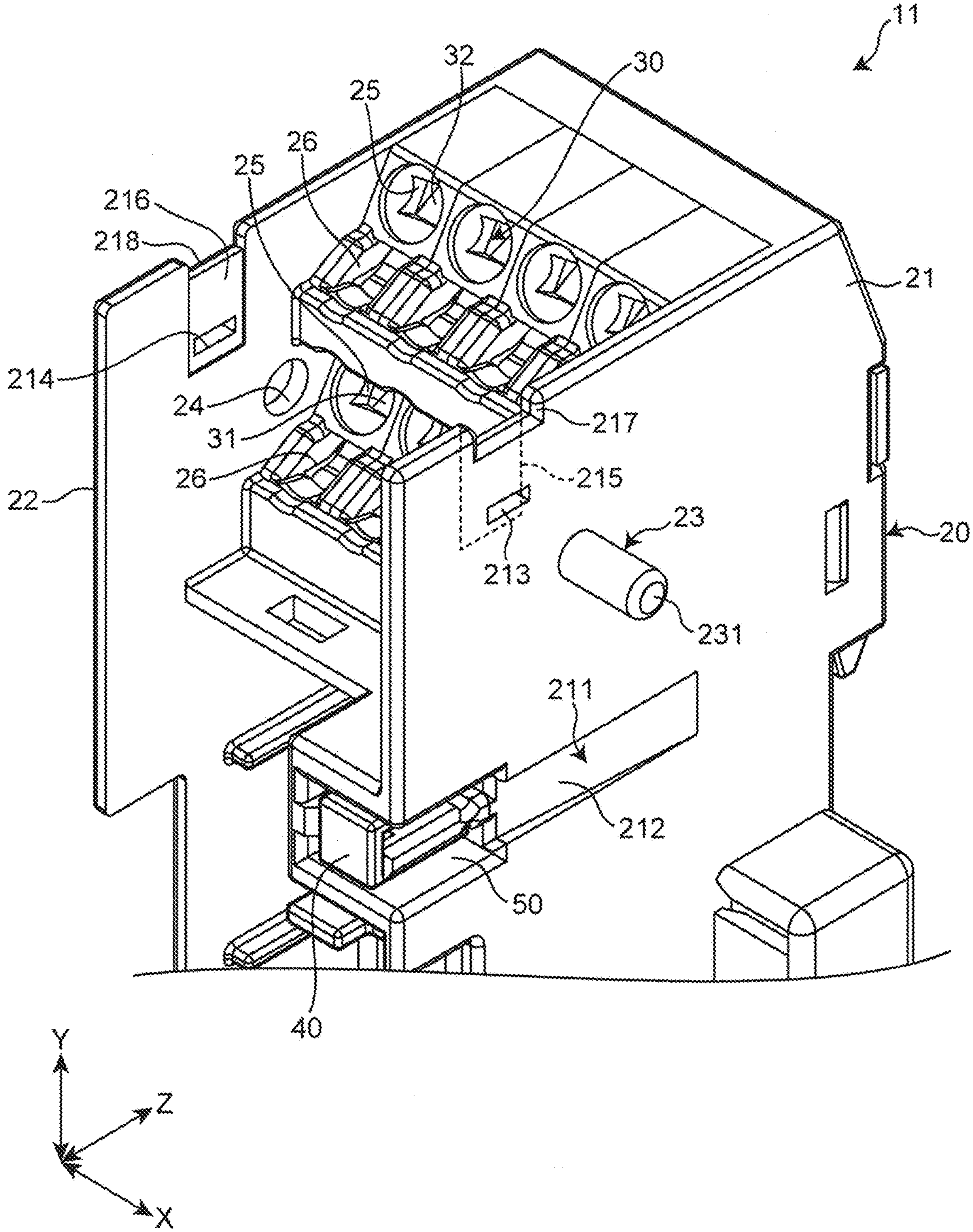
FIG. 3 is a partially enlarged view of a periphery of a protruding portion of FIG. 2.

As shown in FIG. 3, the terminals 30 are independently accommodated in a plurality of accommodating portions (not shown) provided inside the housing 20. Each accommodating portion communicates with an outside of the housing 20 via two opening portions 25 and 26 opened in the third direction Z. One opening portion 25 is configured such that a conductor portion (not shown) of an electric wire can be inserted and removed. Further, the other opening portion 26 is configured such that a long jig (for example, a flathead screwdriver) can be inserted and removed. In FIG. 3, only the first terminal block 11 is shown.

As shown in FIG. 1, the protruding portion 23 of the first terminal block 11 is inserted into the first through hole 24 of the second terminal block 12, and overlaps a part or an entirety of the opening portion 25 connected to the accommodating portion in which the input-side power supply terminal 31 is accommodated when viewed from the third direction Z (that is, the sheet penetration direction of FIG. 1). As a result, the protruding portion 23 functions as an obstructing member that hinders or obstructs connection of the input-side power supply line 2 of the second terminal block 12 to the input-side power supply terminal 31. Further, the protruding portion 23 of the second terminal block 12 is inserted into the first through hole 24 of the third terminal block 13, and functions as an obstructing member that hinders connection of the input-side power supply line 2 of the second terminal block 12 to the input-side power supply terminal 31. That is, the first through hole 24 is configured to allow insertion of an obstructing member.

In addition, as shown in FIG. 2, the housing 20 includes a protrusion 27 provided on the first wall portion 21 and arranged at an interval from the protruding portion 23 in the second direction Y, and a second through hole 28 provided on the second wall portion 22 and arranged at an interval from the first through hole 24 in the second direction Y. In the present embodiment, the protrusion 27 is provided at the other end (that is, the lower end of FIG. 2) of the first wall portion 21 in the longitudinal direction, and the second through hole 28 is provided at the other end of the second wall portion 22 in the longitudinal direction. Each of the protrusion 27 and the second through hole 28 is arranged on an imaginary straight line L3 (shown in FIG. 2) extending in the first direction X.

As shown in FIG. 1, the protrusion 27 of the first terminal block 11 is press-fitted into the second through hole 28 of the second terminal block 12, whereby the first terminal block 11 and the second terminal block 12 are coupled to each other. Further, the protrusion 27 of the second terminal block 12 is press-fitted into the second through hole 28 of the third terminal block 13, whereby the first terminal block 11 and the second terminal block 12 are coupled to each other.

In the present embodiment, the protruding portion 23 is configured to be press-fitted into the first through hole 24, the protruding portion 23 and the protrusion 27 constitute a pair of press-fit protrusions, and the first through hole 24 and the second through hole 28 constitute a pair of press-fit holes. That is, the protruding portion 23 also serves as a press-fit protrusion.

As shown in FIG. 2, the housing 20 includes a jig groove 211 extending along the third direction Z from one edge of the first wall portion 21 in the third direction Z (that is, an edge of the first wall portion 21 on the side where the opening portion portions 25 and 26 of the housing 20 are opened). In the present embodiment, the two jig grooves 211 are arranged between the protruding portion 23 and the protrusion 27 in the second direction Y and in the vicinities of the protruding portion 23 and the protrusion 27, respectively.

As shown in FIG. 3, each jig groove 211 includes a bottom surface 212 facing the adjacent terminal block, and is configured to allow insertion of a long jig (for example, a flathead screwdriver). The bottom surface 212 of each jig groove 211 is inclined so as to approach the adjacent terminal block from one edge toward the other edge in the third direction Z.

According to the terminal blocks 11, 12, and 13, the housing 20 includes the protruding portion 23 that protrudes from the first wall portion 21 in the first direction X and in the direction away from the second wall portion 22 and functions as an obstructing member that hinders connection of the input-side power supply line 2 to the input-side power supply terminal 31, and the through hole 24 that is arranged in the vicinity of the input-side power supply line 2 of the second wall portion 22 and penetrates the second wall portion 22 in the first direction X to allow insertion of the obstructing member. With such a configuration, for example, when the first terminal block 11, the second terminal block 12, and the third terminal block 13 are coupled along the first direction, the protruding portion 23 of the first terminal block 11 prevents connection of the input-side power supply line 2 to the input-side power supply terminal 31 of the second terminal block 12, and the protruding portion 23 of the second terminal block 12 prevents connection of the input-side power supply line 2 to the input-side power supply terminal 31 of the third terminal block 13. As a result, it is possible to realize the terminal blocks 11, 12, and 13 capable of preventing erroneous connection to the power supply terminal 31 when the plurality of the terminal blocks are coupled in an electrically connected state.

According to the terminal block set 1, the terminal blocks 11, 12, and 13 can realize the terminal block set 1 capable of preventing erroneous connection to the power supply terminal 31.

The housing 20 of the first terminal block 11 includes the pair of press-fit protrusions 23 and 27 arranged at an interval in the second direction Y of the first wall portion 21. The housing 20 of the second terminal block 12 includes the pair of press-fit holes 24 and 28 provided on the second wall portion 22 and penetrating the second wall portion 22 in the first direction X. Each of the pair of press-fit protrusions 23 and 27 is configured to be press-fit into each of the pair of press-fit holes 24 and 28, and one of the pair of press-fit protrusions 23 and 27 also serves as the protruding portion 23. With such a configuration, it is possible to more reliably hold the coupling between the adjacent terminal blocks 11 and 12 of the terminal block set 1.

The housing 20 of the first terminal block 11 includes the jig groove 211 that extend along the third direction Z from one edge of the first wall portion 21 in the third direction Z intersecting the first direction X and the second direction Y, the jig groove 211 allowing insertion of a long jig. With such a configuration, for example, by inserting a long jig into each jig groove 211 of the first terminal block 11 of the terminal block set 1, the coupling between the adjacent terminal blocks 11, 12, and 13 (for example, between first terminal block 11 and second terminal block 12 adjacent to first terminal block 11) can be easily released.

The jig groove 211 includes the bottom surface 212 that faces the second terminal block 12 and is inclined so as to approach the second terminal block 12 from one edge toward the other edge in the third direction Z. With such a configuration, for example, it is possible to more easily release the coupling between the adjacent terminal blocks 11, 12, and 13 (for example, between the first terminal block 11 and the second terminal block 12 adjacent to first terminal block 11) of the terminal block set 1 using a long jig.

As shown in FIG. 1, the terminal block set 1 further includes a C-shaped coupling member 40 that couple and hold the adjacent terminal blocks 11, 12, and 13. In the present embodiment, the terminal block set 1 includes four coupling members 40. Two coupling members 40 of the four coupling members 40 sandwich the first wall portion 21 of the housing 20 of the first terminal block 11 and the second wall portion 22 of the housing 20 of the second terminal block 12 at both ends in the second direction Y, respectively. The remaining two coupling members 40 of the four coupling members 40 sandwich the first wall portion 21 of the housing 20 of the second terminal block 12 and the second wall portion 22 of the housing 20 of the third terminal block 13 at both ends in the second direction Y, respectively.

Figure 4:
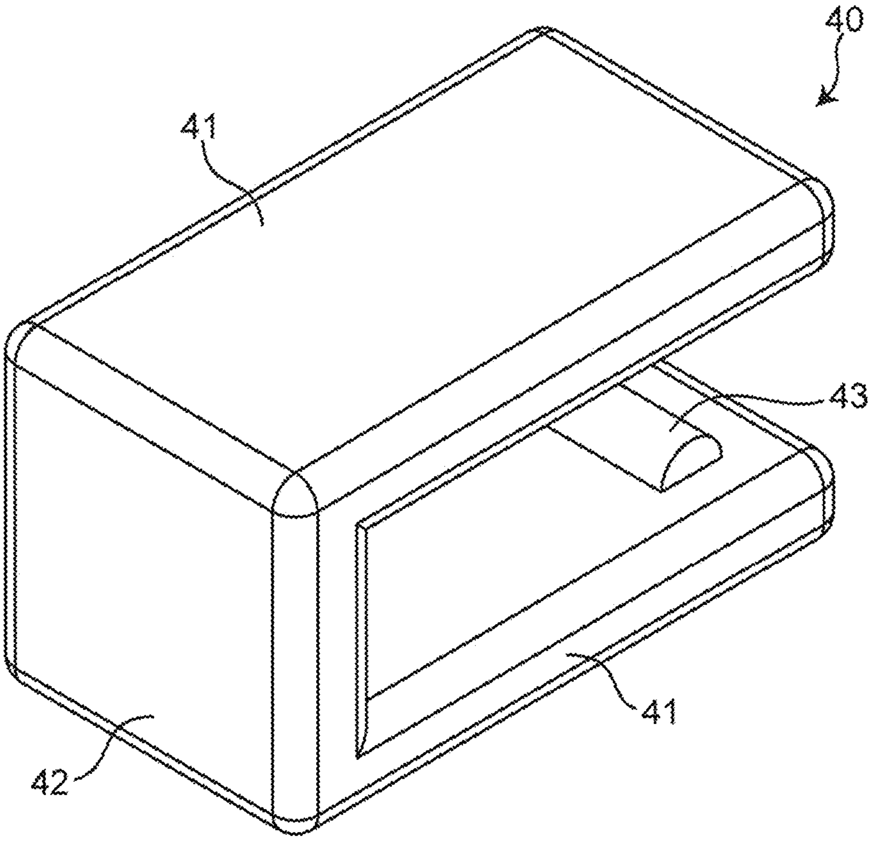
FIG. 4 is a perspective view showing a coupling member of the terminal block set of FIG. 1.
Figure 5:
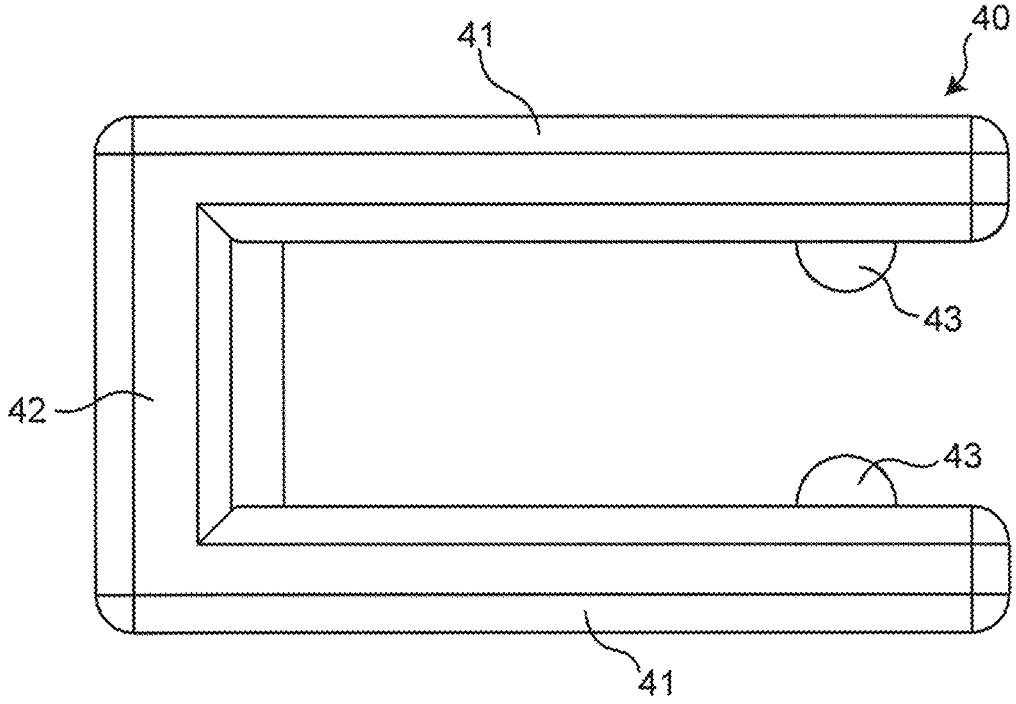
FIG. 5 is a side view of the coupling member of FIG. 4.

Specifically, as shown in FIGS. 4 and 5, the coupling member 40 includes a pair of plate-shaped arm portions 41 that extend such that a plate surface of the pair of arm portions 41 faces each other and is elastically deformable in a direction away from each other, and a connecting portion 42 that connects the pair of arm portions 41. Each arm portion 41 includes a coupling protrusion 43 provided at an end portion farther from the connecting portion 42 in an extending direction of each arm portion 41.

The coupling protrusions 43 each have a substantially semi-cylindrical shape and protrude in a direction approaching each other. One of the coupling protrusions 43 is accommodated in a first accommodation hole 213 of the first terminal block 11 or the second terminal block 12 described later, and the other of the coupling protrusions 43 is accommodated in a second accommodation hole 214 of the second terminal block 12 or the third terminal block 13 described later. A movement of the coupling member 40 in the second direction Y is restricted by accommodating the coupling protrusions 43 in the first accommodation hole 213 and the second accommodation hole 214.

As shown in FIG. 3, the housing 20 of each of the terminal blocks 11, 12, and 13 includes the first accommodation hole 213 and the second accommodation hole 214 capable of accommodating the coupling protrusions 43 of the coupling members 40, and a first accommodation groove 215 and a second accommodation groove 216 that guide the coupling protrusions 43 of the coupling members 40 to each of the accommodation holes 213 and 214.

The first accommodation groove 215 is provided on a surface of the first wall portion 21 facing the second wall portion 22, and extends from an edge of the first wall portion 21 in a direction intersecting the first direction X toward the first accommodation hole 213. In the present embodiment, the first accommodation groove 215 extends toward the first accommodation hole 213 along the second direction Y from a notch 217 provided at the edge of the first wall portion 21 closer to the first accommodation hole 213 in the second direction Y. The second accommodation groove 216 is provided on a surface of the second wall portion 22 facing the first wall portion 21, and extends from an edge of the second wall portion 22 in the direction intersecting the first direction X toward the second accommodation hole 214. In the present embodiment, the second accommodation groove 216 extends toward the second accommodation hole 214 along the second direction Y from a notch 218 provided at the edge of the second wall portion 22 closer to the second accommodation hole 214 in the second direction Y.

One of the pair of arm portions 41 of the coupling member 40 is accommodated in the first accommodation groove 215, and the other of the pair of arm portions 41 of the coupling member 40 is accommodated in the second accommodation groove 216. Thus, a movement of the coupling member 40 in the third direction Z is restricted.

As shown in FIG. 2, the housing 20 of each of the terminal blocks 11, 12, and 13 includes a coupling accommodating portion 50 that accommodate the coupling member 40. In the present embodiment, the housing 20 of each of the terminal blocks 11, 12, and 13 includes two coupling accommodating portions 50 arranged at an interval in the second direction Y. Each coupling accommodating portion 50 is provided at an end portion of the housing 20 on the side where the opening portions 25 and 26 are opened in the third direction Z, and is arranged adjacent to the first wall portion 21 of the housing 20. In FIG. 2, a state in which the coupling members 40 are accommodated in the coupling accommodating portions 50 of the first terminal block 11 is shown.

Figure 6:
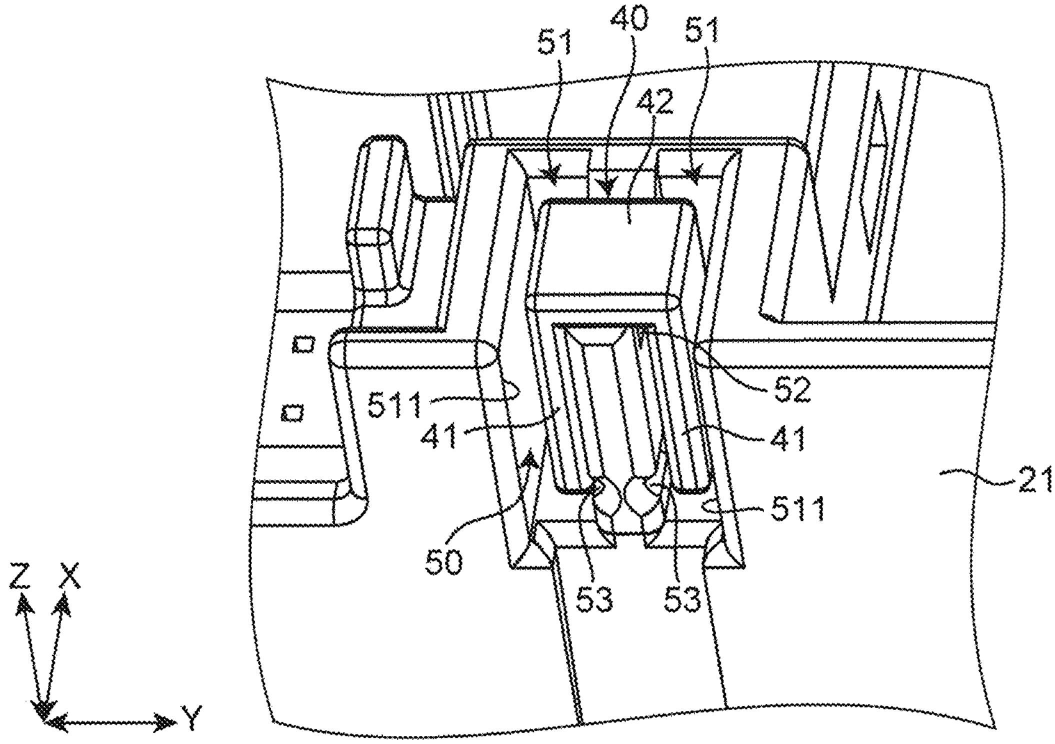
FIG. 6 is a partially enlarged view of a periphery of a coupling accommodating portion of FIG. 2.
Figure 7:
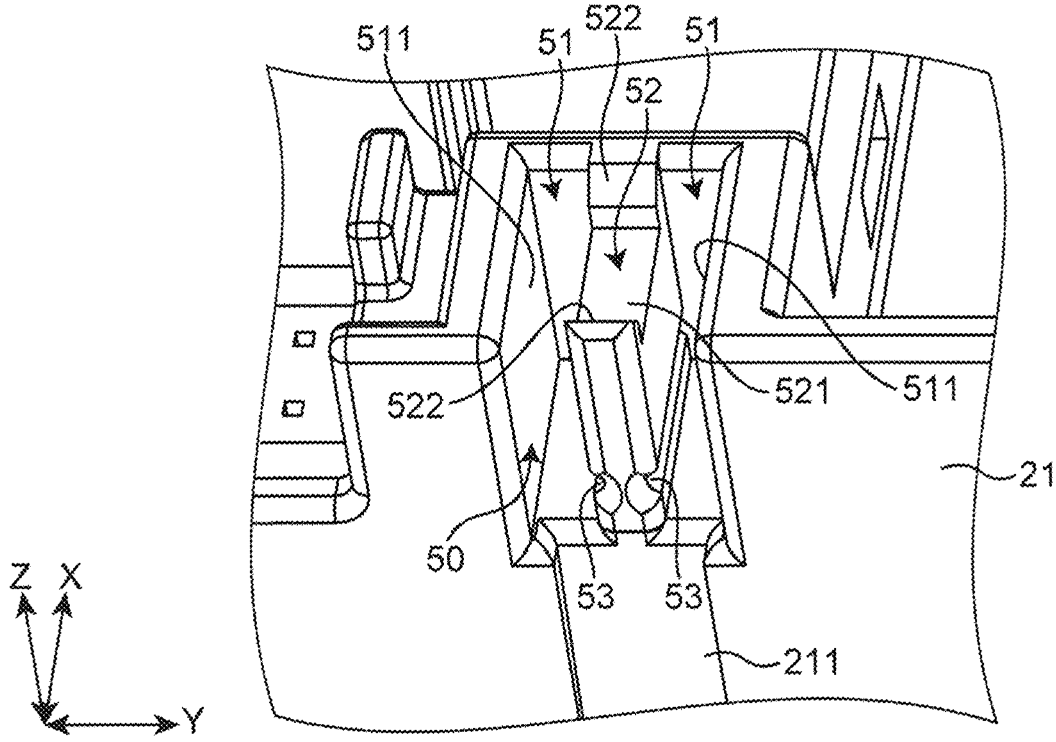
FIG. 7 is a partially enlarged view of FIG. 6 in a state where the coupling member is removed.

Specifically, as shown in FIGS. 6 and 7, the coupling accommodating portion 50 includes a pair of first recessed portions 51 capable of accommodating the pair of arm portions of the coupling member 40, and a second recessed portion 52 arranged between the pair of first recessed portions 51 and capable of accommodating the connecting portion 42 of the coupling member 40.

Each of the first recessed portions 51 has a substantially rectangular parallelepiped shape and includes a substantially L-shaped opening portion 511 extending in the first direction X and the third direction Z. The jig groove 211 of the first wall portion 21 is connected to the opening portion 511 of each of the first recessed portions 51. A Groove 53 extending in a rail shape in the first direction X is provided on an inner surface of the first recessed portions 51 facing each other in the second direction Y. Each groove 53 has a substantially semicircular shape, and is configured to be able to accommodate the coupling protrusion 43 of each arm portion 41 of the coupling member 40.

The second recessed portion 52 includes a recessed-portion main body 521 that accommodates the connecting portion 42 of the coupling member 40, and an inclined surface 522 extending from the recessed-portion main body 521 in a direction intersecting the arrangement direction of the pair of first recessed portions 51 (that is, the second direction Y). In the present embodiment, the second recessed portion 52 has two inclined surfaces 522 extending in directions away from each other from both ends of the recessed-portion main body 521 in the second direction Y.

Each inclined surface 522 is inclined in a direction away from the bottom surface of the recessed-portion main body 521 (that is, upward in the third direction Z of FIGS. 6 and 7) as being away from the recessed-portion main body 521. Each inclined surface 522 guides a long jig (for example, a flathead screwdriver) between the connecting portion 42 of the coupling member 40 and the recessed-portion main body 521, so that the coupling member 40 accommodated in the coupling accommodating portion 50 can be easily removed.

The terminal block set 1 includes the C-shaped coupling members 40 that each sandwich, and couple and hold the first wall portion 21 of the housing 20 of the first terminal block 11 and the second wall portion 22 of the housing 20 of the second terminal block 12. With such a configuration, since the terminal blocks 11, 12, and 13 adjacent to each other can be coupled and held more reliably, it is possible to realize the terminal block set 1 capable of securing coupling reliability between the terminal blocks 11, 12, and 13 adjacent to each other.

The coupling member 40 includes the pair of plate-shaped arm portions 41 that extend such that the plate surface of the pair of arm portions faces each other and is elastically deformable in the direction away from each other. The connecting portion 42 that connects the pair of arm portions 41. Each of the arm portions 41 has the coupling protrusion 43 provided at the end portion farther from the connecting portion 42 in the extending direction and protruding in the direction approaching each other. Each of the first wall portion 21 of the first terminal block 11 and the second wall portion 22 of the second terminal block 12 has each of the first accommodation hole 213 and the second accommodation hole 214 in which the coupling protrusion 43 of each arm portion 41 is accommodated. With such a configuration, a movement of the coupling member 40 can be restricted to prevent the coupling member 40 from unintentionally falling off.

The first wall portion 21 of the first terminal block 11 has the first accommodation groove 215 that is provided on the surface facing the second wall portion 22, extends toward the first accommodation hole 213 from the edge of the first wall portion 21 in the direction intersecting the first direction X, and accommodates one of the pair of arm portions 41 of the coupling member 40. The second wall portion 22 of the second terminal block 12 has the second accommodation groove 216 that is provided on the surface facing the first wall portion 21, extends toward the second accommodation hole 214 from the edge of the second wall portion 22 in the direction intersecting the first direction X, and accommodates the other of the pair of arm portions 41 of the coupling member 40. With such a configuration, a movement of the coupling member 40 can be restricted to prevent the coupling member 40 from unintentionally falling off.

Each of the housing 20 of the first terminal block 11 and the housing 20 of the second terminal block 12 includes the coupling accommodating portion 50 that accommodate the coupling member 40. With such a configuration, for example, since the coupling member 40 that is not used can be accommodated in the coupling accommodating portion 50, the loss of the coupling member 40 can be prevented.

The coupling accommodating portion 50 includes the pair of first recessed portions 51 capable of accommodating the pair of arm portions 41, and the second recessed portion 52 arranged between the pair of first recessed portions 51 and capable of accommodating the connecting portion 42. The second recessed portion 52 includes the recessed-portion main body 521 that accommodates the connecting portion 42, and the inclined surface 522 that extends from the recessed-portion main body 521 along the direction intersecting the arrangement direction of the pair of first recessed portions 51 and is inclined in the direction away from the bottom surface of the recessed-portion main body 521 as being away from the recessed-portion main body 521. With such a configuration, a long jig (for example, a flathead screwdriver) can be guided between the connecting portion 42 of the coupling member 40 and the recessed-portion main body 521, so that the coupling member 40 accommodated in the coupling accommodating portion 50 can be easily removed.

Figure 8:
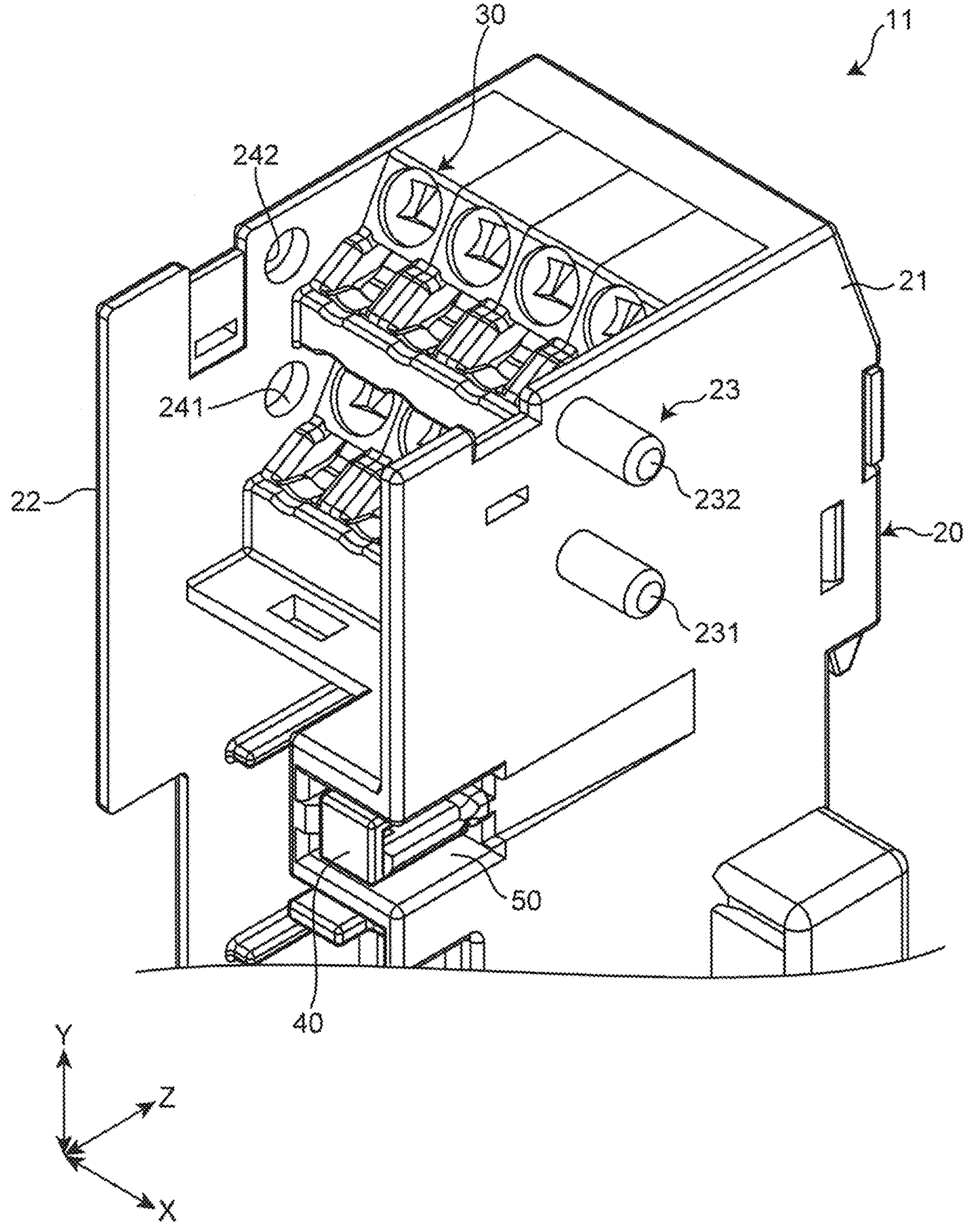
FIG. 8 is a perspective view showing a first modification of the terminal block of FIG. 2.

The protruding portion 23 is not limited to a case where it is formed of one substantially columnar protruding member. For example, as shown in FIG. 8, two substantially cylindrical protruding members 231 and 232 (that is, the first protruding member 231 and a second protruding member 232) may be used. As a result, the protruding portion 23 functions as an obstructing member that hinders connection of the input-side power supply line 2 to the input-side power supply terminal 31 and hinders connection of the output-side power supply line 3 to the output-side power supply terminal 32. The second protruding member 232 is arranged in the vicinity of an imaginary straight line L4 (shown in FIG. 1) extending in the first direction X through the output-side power supply terminal 32. In addition to a substantially circular through hole 241 corresponding to the first protruding member 231, the second wall portion 22 is provided with a substantially circular through hole 242 corresponding to the second protruding member 232. With such a configuration, it is possible to realize the terminal blocks 11, 12, and 13 capable of more reliably preventing erroneous connection to the power supply terminal 31 when the plurality of the terminal blocks are coupled in an electrically connected state.

The protruding members 231 and 232 may have the same shape and size, or may have different shapes and sizes. Each protruding member 231 is not limited to a substantially cylindrical shape, and may have a substantially prismatic shape or an elliptical shape.

Figure 9:
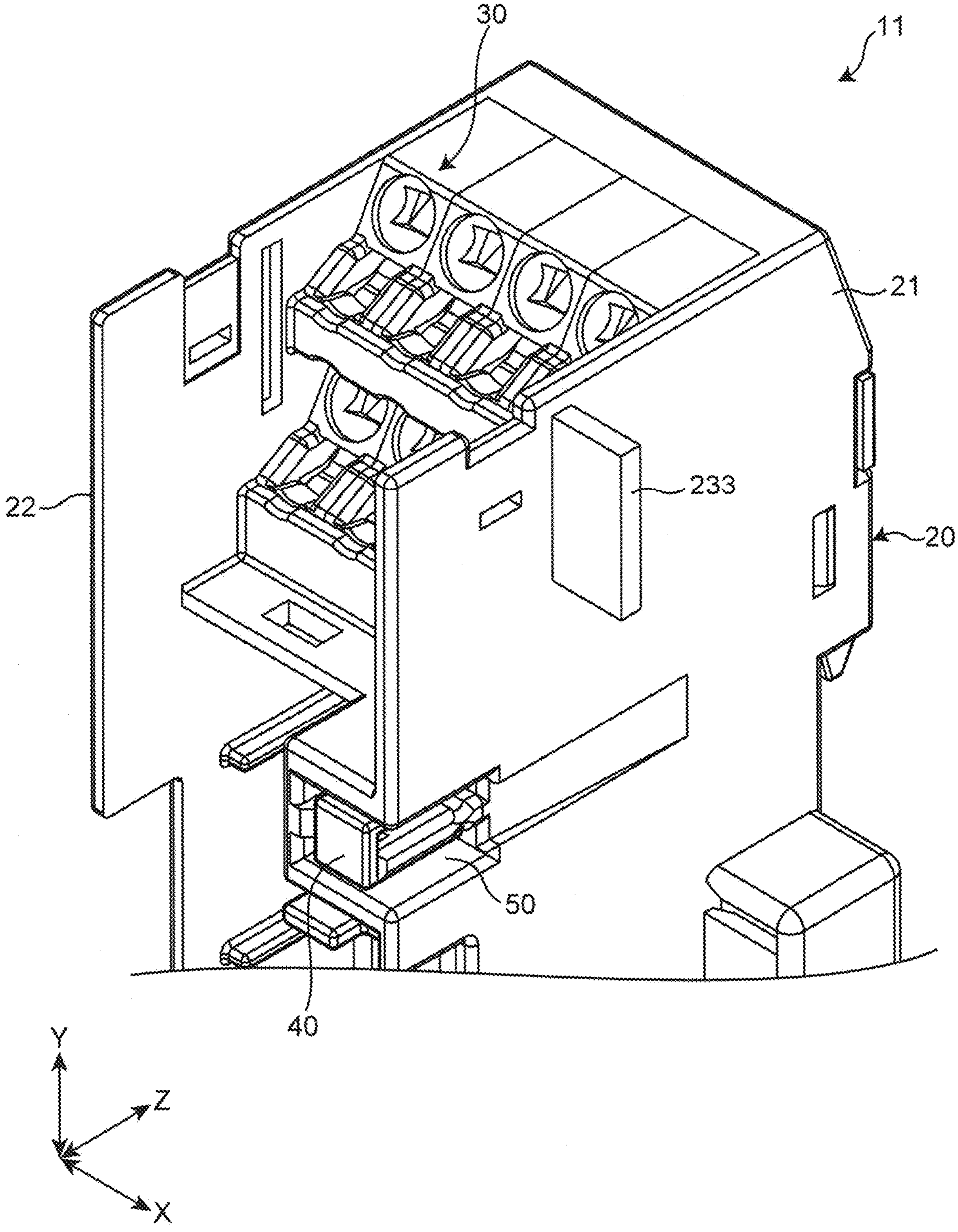
FIG. 9 is a perspective view showing a second modification of the terminal block of FIG. 2.

As shown in FIG. 9, the protruding portion 23 may be constituted by a third protruding member 233 that functions as an obstructing member that simultaneously hinders both connection of the input-side power supply line 2 to the input-side power supply terminal 31 and connection of the output-side power supply line 3 to the output-side power supply terminal 32. In FIG. 9, as an example, the third protruding member 233 having a substantially rectangular plate shape is shown. Both end portions of the third protruding member 233 in the second direction Y are arranged near the imaginary straight lines L1 and L3, respectively. The second wall portion 22 is provided with a through hole 243 having a substantially rectangular shape corresponding to the third protruding member 233. With such a configuration, it is possible to realize the terminal blocks 11, 12, and 13 capable of more reliably preventing erroneous connection to the power supply terminal 31 when the plurality of the terminal blocks are coupled in an electrically connected state.

That is, the protruding portion 23 only needs to function as an obstructing member that hinders at least connection of the input-side power supply line 2 to the input-side power supply terminal 31, and any shape, size, and configuration can be adopted in accordance with the design of the terminal block set 1 and the like.

Each of the terminal blocks 11, 12, and 13 is not limited to the above embodiment, and can be optionally configured in accordance with a design of the terminal block set 1 or the like as long as it includes the housing 20 including the first wall portion 21 and the second wall portion 22, and the input-side power supply terminal 31 and the output-side power supply terminal 32 arranged inside the housing 20. The terminal blocks 11, 12, and 13 may be electrically disconnected when coupled to each other.

The coupling member 40 only needs to have a C shape and be capable of sandwiching, and coupling and holding the first wall portion 21 of the terminal block (for example, first terminal block 11) and the second wall portion 22 of the terminal block (for example, second terminal block 12) adjacent to the terminal block, and can be optionally configured in accordance with a design of the terminal block set 1 or the like.

The coupling accommodating portion 50 only needs to accommodate the coupling member 40, and can be optionally configured in accordance with a design of the terminal block set 1 or the like.

The coupling accommodating portion 50, the accommodation holes 213 and 214, and the accommodation grooves 215 and 216 can be omitted.

The protruding portion 23 does not need to also serve as the press-fit protrusion, and the press-fit protrusion may be separately provided.

The protruding portion 23 and the protrusion 27 (that is, the pair of press-fit protrusions), the through holes 24 and 28 (that is, the pair of press-fitting holes), and the jig grooves 211 can be omitted.

Various embodiments of the present disclosure have been described above in detail with reference to the drawings. Finally, various aspects of the present disclosure will be described. In the following description, as an example, reference numerals are also added.

A terminal block set 1 of a first aspect of the present disclosure, in which a plurality of terminal blocks 11, 12, and 13 are coupled along a first direction X, each of the terminal blocks 11, 12, and 13 including a housing 20 that includes a first wall portion 21 provided on one side in the first direction X and a second wall portion 22 provided on the other side in the first direction X, includes:

- a first terminal block 11 and a second terminal block 12 adjacent to the first terminal block 11 as the plurality of terminal blocks 11, 12, and 13; and
- a C-shaped coupling member 40 that sandwiches, and couples and holds the first wall portion 21 of the housing 20 of the first terminal block 11 and the second wall portion 22 of the housing 20 of the second terminal block 12.

The terminal block set 1 of the first aspect includes the C-shaped coupling member 40 that sandwiches, and couples and holds the first wall portion 21 of the housing 20 of the first terminal block 11 and the second wall portion 22 of the housing 20 of the second terminal block 12. With such a configuration, since the terminal blocks 11, 12, and 13 adjacent to each other can be coupled and held more reliably, it is possible to realize the terminal block set 1 capable of securing coupling reliability between the terminal blocks 11, 12, and 13 adjacent to each other.

In the terminal block set 1 of a second aspect of the present disclosure, the coupling member 40 includes:

- a pair of plate-shaped arm portions 41 that extend such that a plate surface of the pair of arm portions faces each other and is elastically deformable in a direction away from each other; and
- a connecting portion 42 that connects the pair of arm portions 41,
- each of the pair of arm portions 41 includes a coupling protrusion 43 provided at an end portion farther from the connecting portion 42 in an extending direction thereof, the coupling protrusion 43 protruding in a direction approaching each other, and
- each of the first wall portion 21 of the first terminal block 11 and the second wall portion 22 of the second terminal block 12 includes a first accommodation hole 213 and a second accommodation hole 214 in which the coupling protrusions 43 of the pair of arm portions 41 are accommodated, respectively.

According to the terminal block set 1 of the second aspect, a movement of the coupling member 40 can be restricted to prevent the coupling member 40 from unintentionally falling off.

In a terminal block set 1 of a third aspect of the present disclosure,

- the first wall portion 21 of the first terminal block 11 includes a first accommodation groove 215 that is provided on a surface facing the second wall portion 22, extends toward the first accommodation hole 213 from an edge of the first wall portion 21 in a direction intersecting the first direction X, and accommodates one of the pair of arm portions 41 of the coupling member 40, and
- the second wall portion 22 of the second terminal block 12 includes a second accommodation groove 216 that is provided on a surface facing the first wall portion 21, extends toward the second accommodation hole 214 from an edge of the second wall portion 22 in the direction intersecting the first direction X, and accommodates the other of the pair of arm portions 41 of the coupling member 40.

According to the terminal block set 1 of the third aspect, a movement of the coupling member 40 can be restricted to prevent the coupling member 40 from unintentionally falling off.

In a terminal block set 1 of a fourth aspect of the present disclosure,

- the housing 20 of the first terminal block 11 includes a pair of press-fit protrusions 23 and 27 arranged at an interval in a second direction Y intersecting the first direction of the first wall portion 21,
- the housing 20 of the second terminal block 12 includes a pair of press-fit holes 24 and 28 provided on the second wall portion 22 and penetrating the second wall portion 22 in the first direction X, and each of the pair of press-fit protrusions 23 and 27 is configured to be press-fit into each of the pair of press-fit holes 24 and 28.

According to the terminal block set 1 of the fourth aspect, it is possible to more reliably hold the coupling between the adjacent terminal blocks 11, 12, and 13 of the terminal block set 1.

In a terminal block set 1 of a fifth aspect of the present disclosure, each of the housing 20 of the first terminal block 11 and the housing 20 of the second terminal block 12 includes a coupling accommodating portion 50 that accommodates the coupling member 40.

According to a terminal block set 1 of a fifth aspect, for example, since the coupling member 40 that is not used can be accommodated in the coupling accommodating portion 50, the loss of the coupling member 40 can be prevented.

In a terminal block set 1 of a sixth aspect of the present disclosure, the coupling member 40 includes:

a pair of plate-shaped arm portions 41 that extend such that a plate surface of the pair of plate-shaped arm portions 41 faces each other and is elastically deformable in a direction away from each other; and a connecting portion 42 that connects the pair of arm portions, the coupling accommodating portion 50 includes:

a pair of first recessed portions 51 capable of accommodating the pair of arm portions 41; and a second recessed portion 52 arranged between the pair of first recessed portions 51 and capable of accommodating the connecting portion 42, and the second recessed portion 52 includes:

a recessed-portion main body 521 that accommodates the connecting portion 42; and an inclined surface 522 that extends from the recessed-portion main body 521 along a direction intersecting an arrangement direction of the pair of first recessed portions 51 and is inclined in a direction away from a bottom surface of the recessed-portion main body 521 as being away from the recessed-portion main body 521.

According to the terminal block set 1 of the sixth aspect, for example, a long jig (for example, a flathead screwdriver) can be guided between the connecting portion 42 of the coupling member 40 and the recessed-portion main body 521, so that the coupling member 40 accommodated in the coupling accommodating portion 50 can be easily removed.

By appropriately combining any embodiments or modifications among the various embodiments or modifications, the effects of the respective embodiments or modifications can be achieved. In addition, combinations of embodiments, combinations of examples, or combinations of embodiments and examples are possible, and combinations of features in different embodiments or examples are also possible.

Although the present disclosure has been fully described in connection with preferred embodiments with reference to the accompanying drawings, various modifications and corrections will be apparent to those skilled in the art. Such modifications and corrections are to be understood as being included within the scope of the present disclosure as set forth in the appended claims.

INDUSTRIAL APPLICABILITY

The terminal blocks and the terminal block set of the present disclosure can be used for, for example, a temperature regulator of a control panel.

REFERENCE SIGNS LIST

1. terminal block set
2. input-side power supply line
3. output-side power supply line
11, 12, 13. terminal block
20. housing
21. first wall portion
211. jig groove
212. bottom surface
213, 214. accommodation hole
215, 216. accommodation groove
217, 218. notch
22. second wall portion
23. protruding portion
231, 232, 233. protruding member
24, 241, 242, 243. through hole
25, 26. opening portion
27. protrusion
28. through hole
30. terminal
31. input-side power supply terminal
32. output-side power supply terminal
40. coupling member
41. arm portion
42. connecting portion
43. coupling protrusion
50. coupling accommodating portion
51. first recessed portion
511. opening portion
52. second recessed portion
521. recessed-portion main body
522. inclined surface
X. first direction
Y. second direction
Z. third direction
L1 to L4. imaginary straight line

The invention claimed is:

1. A terminal block set in which a plurality of terminal blocks are coupled along a first direction, each of the terminal blocks including a housing that includes a first wall portion provided on a first side in the first direction and a second wall portion provided on a second side in the first direction, the terminal block comprising:

a first terminal block and a second terminal block adjacent to the first terminal block as the plurality of terminal blocks; and a C-shaped coupling member that sandwiches, and couples and holds the first wall portion of the housing of the first terminal block and the second wall portion of the housing of the second terminal block, wherein the coupling member includes:

a pair of plate-shaped arm portions that extend such that a plate surface of the pair of arm portions faces each other and is elastically deformable in a direction away from each other; and a connecting portion that connects the pair of arm portions, each of the pair of arm portions includes a coupling protrusion provided at an end portion farther from the connecting portion in an extending direction thereof, the coupling protrusion protruding in a direction approaching each other, and each of the first wall portion of the first terminal block and the second wall portion of the second terminal block includes a first accommodation hole and a second accommodation hole in which the coupling protrusions of the pair of arm portions are accommodated, respectively.

2. The terminal block set according to claim 1, wherein the first wall portion of the first terminal block includes a first accommodation groove that is provided on a surface facing the second wall portion, extends toward the first accommodation hole from an edge of the first wall portion in a direction intersecting the first direction, and accommodates one of the pair of arm portions of the coupling member, and the second wall portion of the second terminal block includes a second accommodation groove that is provided on a surface facing the first wall portion, extends toward the second accommodation hole from an edge of the second wall portion in the direction intersecting the first direction, and accommodates another of the pair of arm portions of the coupling member.

3. The terminal block set according to claim 1, wherein each of the housing of the first terminal block and the housing of the second terminal block includes a coupling accommodating portion that accommodates the coupling member.

4. A terminal block set in which a plurality of terminal blocks are coupled along a first direction, each of the terminal blocks including a housing that includes a first wall portion provided on a first side in the first direction and a second wall portion provided on a second side in the first direction, the terminal block comprising:

a first terminal block and a second terminal block adjacent to the first terminal block as the plurality of terminal blocks; and a C-shaped coupling member that sandwiches, and couples and holds the first wall portion of the housing of the first terminal block and the second wall portion of the housing of the second terminal block, wherein the housing of the first terminal block includes a pair of press-fit protrusions arranged at an interval in a second direction intersecting the first direction of the first wall portion, the housing of the second terminal block includes a pair of press-fit holes provided on the second wall portion and penetrating the second wall portion in the first direction, and each of the pair of press-fit protrusions is configured to be press-fit into each of the pair of press-fit holes.

5. A terminal block set in which a plurality of terminal blocks are coupled along a first direction, each of the terminal blocks including a housing that includes a first wall portion provided on a first side in the first direction and a second wall portion provided on a second side in the first direction, the terminal block comprising:

a first terminal block and a second terminal block adjacent to the first terminal block as the plurality of terminal blocks; and a C-shaped coupling member that sandwiches, and couples and holds the first wall portion of the housing of the first terminal block and the second wall portion of the housing of the second terminal block, wherein each of the housing of the first terminal block and the housing of the second terminal block includes a coupling accommodating portion that accommodates the coupling member, the coupling member includes:

a pair of plate-shaped arm portions that extend such that a plate surface of the pair of plate-shaped arm portions faces each other and is elastically deformable in a direction away from each other; and a connecting portion that connects the pair of arm portions, the coupling accommodating portion includes:

a pair of first recessed portions capable of accommodating the pair of arm portions; and a second recessed portion arranged between the pair of first recessed portions and capable of accommodating the connecting portion, and the second recessed portion includes:

a recessed-portion main body that accommodates the connecting portion; and an inclined surface that extends from the recessed-portion main body along a direction intersecting an arrangement direction of the pair of first recessed portions and is inclined in a direction away from a bottom surface of the recessed-portion main body as being away from the recessed-portion main body.

* * * * *